M. A. CULLING.
AIR BRAKE FOR RAILROAD TRAINS.
APPLICATION FILED NOV. 12, 1917.
1,276,036.
Patented Aug. 20, 1918.
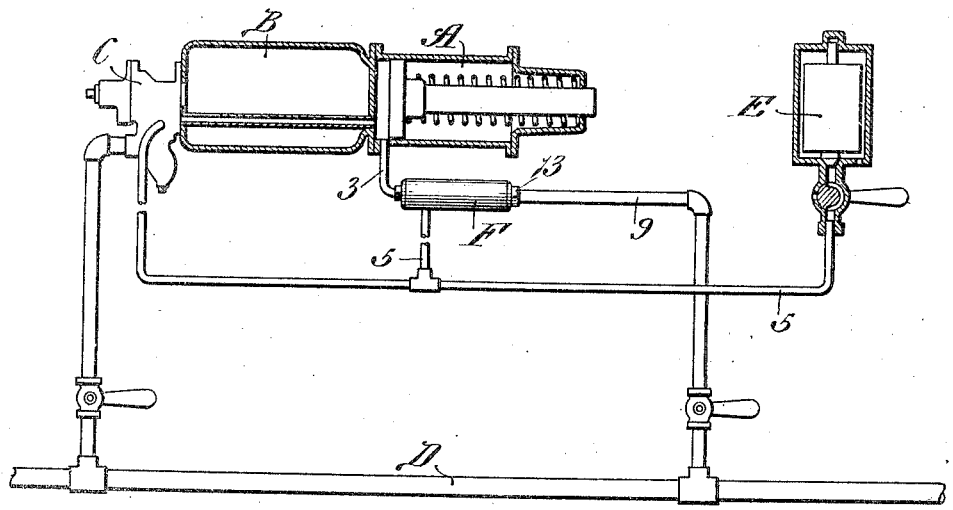
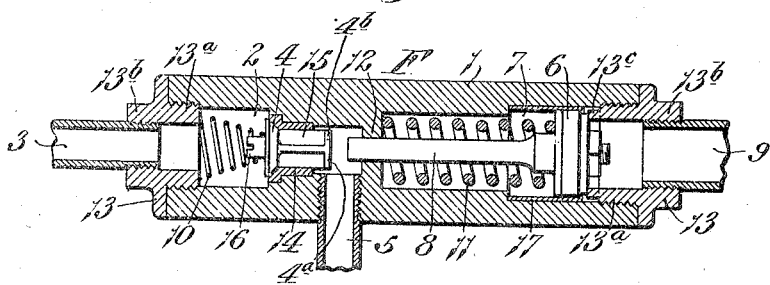
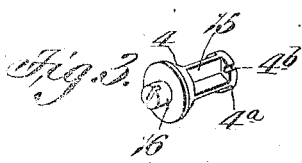
Inventor,
Merritt A. Culling.
By Bakewell Cline, attys.

UNITED STATES PATENT OFFICE.

MERRITT A. CULLING, OF LOUISIANA, MISSOURI, ASSIGNOR TO FRANK W. BUFFUM, OF LOUISIANA, MISSOURI.

AIR-BRAKE FOR RAILROAD-TRAINS.

1,276,036.  Specification of Letters Patent.  Patented Aug. 20, 1918.

Application filed November 12, 1917. Serial No. 201,525.

*To all whom it may concern:*

Be it known that I, MERRITT A. CULLING, a citizen of the United States, residing at Louisiana, Missouri, have invented a certain new and useful Improvement in Air-Brakes for Railroad-Trains, of which the following is a full, clear, and exact description, such as will enable other skilled in the art to which it appertains to make and use the same.

This invention relates to air brakes for railroad trains and is an improvement on the air brake attachment described in the pending application of Ernest D. Finley for air brake for railroad trains, Serial No. 186,708, filed August 17, 1917.

The main object of my invention is to provide an efficient device of simple construction that can be easily attached to an air brake system for railroad trains so as to insure the release of the brakes, even though the triple valve sticks or fails to operate when the pressure in the train pipe is increased to effect the release of the brakes.

Figure 1 of the drawings is a diagrammatic view, illustrating an air brake system for railroad trains equipped with a device constructed in accordance with my invention;

Fig. 2 is a longitudinal sectional view of my device; and

Fig. 3 is a perspective view of the exhaust valve.

In the air brake system described in the Finley application previously referred to a valve separate and distinct from the usual triple valve is provided for governing the exhaust of air from the brake cylinder, said exhaust valve being controlled by the pressure in the train pipe. Said exhaust valve normally occupies such a position that communication is established between the interior of the brake cylinder and the atmosphere or an exhaust pipe and means is provided for moving said exhaust valve into its closed position whenever the pressure in the train pipe is reduced to set the brakes. When the pressure in the train pipe is thereafter increased so as to release the brakes, said exhaust valve moves automatically into its open position, thus permitting the air to escape from the brake cylinder, even though the triple valve sticks or fails to operate. My invention consists of a device constructed in such a manner that it can be easily applied to an air brake system and provided with an efficient exhaust valve and an efficient means for actuating said valve to move it into its open and into its closed position.

Referring to the drawings which illustrate an air brake system of the kind now in general use equipped with a device constructed in accordance with my invention, A designates a brake cylinder, B an auxiliary air tank, C a triple valve which causes air to pass from the air tank B into the brake cylinder and thus operate the brakes whenever the pressure in the train pipe D is reduced under ordinary operating conditions, and also causes air to escape from said brake cylinder whenever the pressure in the train pipe is increased, said system also comprising a pressure retaining valve E that is adapted to be operated by the brakeman so as to retain sufficient pressure in the brake cylinder to hold the brakes partially set under certain conditions, as, for example, when the train is traveling down a long grade. The elements above referred to are of well known construction and form no part of my present invention.

My invention consists in a device, designated as an entirety by the reference character F which is combined with the train pipe D and the brake cylinder A in such a manner that it is impossible for air to become trapped in the brake cylinder, and thus hold the brakes set, in case the triple valve C sticks when the pressure in the train pipe D is increased. Said device F comprises a body portion 1 provided with an exhaust chamber 2 that is connected by means of a pipe 3 with the brake cylinder A at a point behind the piston in said brake cylinder. A valve 4 that is mounted in the exhaust chamber 2 governs the discharge of air from said chamber into an exhaust pipe 5 that may lead either to the atmosphere or to the usual exhaust pipe 5 that is combined with the pressure-retaining valve and the triple valve. The device F is provided with a means for unseating the exhaust valve 4 and holding it in its open position, which means consists of a piston 6 reciprocatingly mounted in a cylinder 7 in the body portion 1 of the device F and provided with a stem 8 that engages the stem of the exhaust valve 4 and moves said valve into its open position when the pressure in the train pipe D is increased to release the brakes, said cylinder 7 being connected by means of a pipe 9 with the train pipe D. The exhaust valve 4 is moved in the opposite direction, namely, to seat or close said valve by means of a spring 10 and the piston 6 is moved in the opposite direction when the pressure in the train pipe is reduced by means of a spring 11.

The body portion 1 of the device F is preferably formed from a single piece of metal having longitudinally-extending bores formed in same to constitute the exhaust chamber 2 and the cavity for the cylinder 7 in which the piston 6 is reciprocatingly mounted, said chamber and cavity being separated from each other by means of a transversely-disposed partition 12 that serves as a guide for the stem 8 of the piston 6. The opposite ends of the body portion 1 of the device are closed by caps 13, each of which is provided with an externally screw-threaded portion 13$^a$ that is screwed into said body portion and an internally screw-threaded portion 13$^b$ that serves as a connection for the pipe that leads to the end of the body portion which the cap closes. The exhaust valve 4 is provided with a tapered portion that fits snugly in a tapered seat, preferably formed in a brass bushing 14, that is mounted in the body portion 1 of the device, as shown in Fig. 2, and the stem 15 of said exhaust valve is made substantially cruciform-shape in cross section, so as to permit the air to escape from the exhaust chamber 2 when said valve is opened. In order to restrict the passage of the escaping air so that the brakes will not be released too suddenly when the pressure in the train pipe is increased, I provide the valve 4 with a disk-shaped portion 4$^a$ that is forced into the bushing 14 when the plunger 8 is moved to the left, said disk-shaped portion having a small aperture or notch 4$^b$ therein through which the exhaust air is permitted to escape slowly. The spring 10 previously referred to that moves the valve into its closed position is interposed between the top face of the valve and the cap 13 that forms a closure for the exhaust chamber 2, said spring being held centered by means of a projection 16 on the exhaust valve. The cylinder 7 previously referred to in which the piston 6 is reciprocatingly mounted is preferably formed by a cylindrical-shaped member 17 constructed of brass or other suitable material that is set in the body portion 1 of the device, and the spring 11 which moves the piston 6 in one direction is interposed between said piston and the partition 12 that separates the two bores in the body portion 1 of the device. The piston 6 may be of any preferred construction and the cap 13 which forms a closure for the cylinder in which said piston is mounted is preferably provided with inwardly-projecting lugs 13$^c$ that serve as stops which limit the outward movement of said piston.

When the train is running along under normal conditions the piston 6 occupies such a position that the stem 8 of same bears against the stem of the exhaust valve 4, and thus holds said valve open. When the pressure in the train pipe D is reduced to set the brakes, the piston 6 moves to the right, looking at Fig. 2, under the influence of the spring 11, and thus permits the spring 10 to move the exhaust valve 4 into its closed position, thereby cutting off communication between the brake cylinder and the exhaust pipe 5. When the pressure in the train pipe D is thereafter increased to release the brakes, the piston 6 moves in the opposite direction, namely, to the left, and the stem on said piston engages the stem of the exhaust valve 4 and moves said exhaust valve into its open position, thereby permitting the air to escape from the brake cylinder, even though the triple valve C sticks or fails to operate.

A device of the construction above described can be applied easily to air brake systems for railroad trains, owing to the fact that the exhaust valve 4 and the piston 6 that moves said valve into its open position are both carried by a single unit that can be connected with the train pipe and the brake cylinder by means of pipes that are screwed into the opposite ends of said unit. The exhaust valve 4 is of such form that it will not wear out, and thus permit the air to leak out of the brake cylinder, after the device has been in use for a long period, and the piston is of such form and is combined with the exhaust valve in such a manner that there is little liability of its failing to operate properly when the device is in use. In addition to the desirable features above pointed out, my improved device can be manufactured cheaply and it is of such rugged design that it can be used for a long period without repair or replacement of any of the parts of same.

Having thus described my invention, what I claim, and desire to secure by Letters Patent, is:

1. Attachment for air brakes for railroad trains, consisting of a device that comprises a body portion which has two bores formed longitudinally in same, said bores being separated from each other by a partition, caps screwed into the opposite ends of said device so as to form closures for said bores, an exhaust valve in one of said bores provided with a tapered head that coöperates with a tapered seat in said bore, a reciprocating piston mounted in the other bore and provided with a stem that passes through said partition and engages said valve when said piston moves in one direction, and springs combined with said piston and valve for moving the piston in the opposite direction and for seating said valve, said caps having internal screw threads for receiving pipes that connect the device with the train pipe and with the brake cylinder of the system, and a cylindrical-shaped member set in one of the bores in the body portion so as to form a cylinder for said piston.

2. An attachment for air brake systems for railroad trains, consisting of a device comprising a body portion having longitudinally-extending bores formed in same, which bores are separated from each other by means of a partition, a bushing in one of said bores provided with a tapered valve seat, a cylindrical member in the other bore that forms the side wall of a cylinder, a spring-actuated exhaust valve provided with a stem of substantially cruciform shape in cross section that is reciprocatingly mounted in said bushing, said stem having a disk provided with an opening and a spring-pressed piston in said cylinder provided with a stem that projects through the partition in said body portion and engages the stem of said exhaust valve and moves it in a direction to unseat said valve when said piston moves in one direction.

MERRITT A. CULLING.

Copies of this patent may be obtained for five cents each, by addressing the "Commissioner of Patents, Washington, D. C."